US009372364B2

(12) United States Patent
Kim et al.

(10) Patent No.: US 9,372,364 B2
(45) Date of Patent: Jun. 21, 2016

(54) DISPLAY PANEL AND METHOD FOR MANUFACTURING THE SAME

(71) Applicant: SAMSUNG DISPLAY CO., LTD., Yongin, Gyeonggi-Do (KR)

(72) Inventors: Jang-Hyun Kim, Gyeonggi-do (KR); Keun-Chan Oh, Chungcheongnam-do (KR); Won-Gap Yoon, Gyeonggi-do (KR); Jin-Hyeong Lee, Seoul (KR); Chang-Hun Lee, Gyeonggi-do (KR); Ji-Eun Jang, Gyeonggi-do (KR)

(73) Assignee: SAMSUNG DISPLAY CO., LTD., Yongin, Gyeonggi-Do (KR)

( * ) Notice: Subject to any disclaimer, the term of this patent is extended or adjusted under 35 U.S.C. 154(b) by 43 days.

(21) Appl. No.: 14/242,933

(22) Filed: Apr. 2, 2014

(65) Prior Publication Data
US 2015/0062524 A1 Mar. 5, 2015

(30) Foreign Application Priority Data

Sep. 3, 2013 (KR) .......................... 10-2013-0105309

(51) Int. Cl.
G02F 1/1339 (2006.01)
(52) U.S. Cl.
CPC .................... *G02F 1/1339* (2013.01)
(58) Field of Classification Search
CPC ............................ G02F 1/1339; G02F 1/13394
USPC ................................................ 349/153
See application file for complete search history.

(56) References Cited

U.S. PATENT DOCUMENTS

| 5,238,730 | A | * | 8/1993 | Hanawa et al. | ................. | 442/85 |
| 5,596,023 | A | * | 1/1997 | Tsubota | .............. | C08F 299/028 |
| | | | | | | 349/153 |
| 6,882,399 | B2 | | 4/2005 | Park | | |
| 7,894,004 | B2 | | 2/2011 | Mizuno et al. | | |

(Continued)

FOREIGN PATENT DOCUMENTS

| JP | 2003140197 | 5/2003 |
| JP | 2006062344 | 3/2006 |

(Continued)

OTHER PUBLICATIONS

Hwan Kyu Suh et al., "The Studies of the Water-Vapour Transmission Rate and It's Proofness on the Variou Commercial Polymer Films", Journal of the Korean Chemical Society, vol. 23, No. 5, 1979, 329-337.

(Continued)

*Primary Examiner* — Lucy Chien
(74) *Attorney, Agent, or Firm* — F. Chau & Associates, LLC

(57) ABSTRACT

A display panel is provided. A first substrate includes a display area and a peripheral area. The peripheral area surrounds the display area. A second substrate is disposed on the first substrate. The second substrate faces the first substrate along a first direction. A liquid crystal layer is interposed between the first substrate and the second substrate. A multi-layered sealant is disposed on the peripheral area of the first substrate. The multi-layered sealant surrounds the liquid crystal layer. The multi-layered sealant includes a first sealant layer including an acrylate resin having a functional group having at least 3 carbon atoms, and a second sealant layer including an epoxy resin having a (meth)arcylate group.

20 Claims, 9 Drawing Sheets

(56) References Cited

U.S. PATENT DOCUMENTS

| | | |
|---|---|---|
| 7,952,680 B2 | 5/2011 | Terao et al. |
| 8,405,309 B2 | 3/2013 | Lee |
| 2002/0008838 A1* | 1/2002 | Matsuda ............... 349/187 |
| 2005/0030471 A1* | 2/2005 | Liou ..................... 349/190 |
| 2007/0211202 A1 | 9/2007 | Ishii et al. |
| 2008/0062374 A1* | 3/2008 | Katsumura et al. ........ 349/153 |
| 2009/0250104 A1* | 10/2009 | Inoue et al. ............ 136/256 |
| 2010/0253658 A1 | 10/2010 | Tanaka et al. |
| 2012/0013970 A1 | 1/2012 | Shin et al. |
| 2012/0327355 A1 | 12/2012 | Cheng et al. |
| 2013/0033664 A1 | 2/2013 | Lee et al. |
| 2013/0088661 A1 | 4/2013 | Shin et al. |
| 2013/0088673 A1 | 4/2013 | Shiau |

FOREIGN PATENT DOCUMENTS

| | | |
|---|---|---|
| JP | 2006267532 | 10/2006 |
| KR | 1020030027216 | 4/2003 |
| KR | 1020060040061 | 5/2006 |
| KR | 1020060112948 | 11/2006 |
| KR | 1020070046421 | 5/2007 |
| KR | 1020070118364 | 12/2007 |
| KR | 1020100067367 | 6/2010 |

OTHER PUBLICATIONS

Korean Search Report.

* cited by examiner

DISPLAY PANEL AND METHOD FOR MANUFACTURING THE SAME

This application claims priority under 35 U.S.C. §119 to Korean Patent Application No. 10-2013-0105309, filed on Sep. 3, 2013 in the Korean Intellectual Property Office (KIPO), the disclosure of which is incorporated by reference herein in its entirety.

TECHNICAL FIELD

The present invention relates to a display panel and a method for manufacturing the same.

DISCUSSION OF THE RELATED ART

Liquid crystal displays (LCDs) are used for a large flat panel display devices. Liquid crystal displays include a liquid crystal layer displaying image according to an electric field thereto. Moisture penetrating into the liquid crystal layer may degrade the display quality.

SUMMARY

According to an exemplary embodiment of the present invention, a display panel is provided. A first substrate includes a display area and a peripheral area. The peripheral area surrounds the display area. A second substrate is disposed on the first substrate. The second substrate faces the first substrate along a first direction. A liquid crystal layer is interposed between the first substrate and the second substrate. A multi-layered sealant is disposed on the peripheral area of the first substrate. The multi-layered sealant surrounds the liquid crystal layer. The multi-layered sealant includes a first sealant layer including an acrylate resin having a functional group having at least 3 carbon atoms, and a second sealant layer including an epoxy resin having a (meth)arcylate group.

According to an exemplary embodiment of the present invention, a method for manufacturing a display panel is provided. A sealing composition is provided to a peripheral area of a first substrate. The sealing composition includes a first sealing composition including acrylate resin having a functional group having at least 3 carbon atoms, and a second sealing composition including modified epoxy resin having a (meth)arcylate group. A second substrate is stacked on the sealing composition to face the first substrate. Light is provided to the sealing composition to harden the sealing composition. Heat is provided to the sealing composition to further harden the sealing composition.

BRIEF DESCRIPTION OF THE DRAWINGS

These and other features of the present invention will become more apparent by describing in detail exemplary embodiments thereof with reference to the accompanying drawings of which.

DETAILED DESCRIPTION OF EMBODIMENTS

Figure 1:
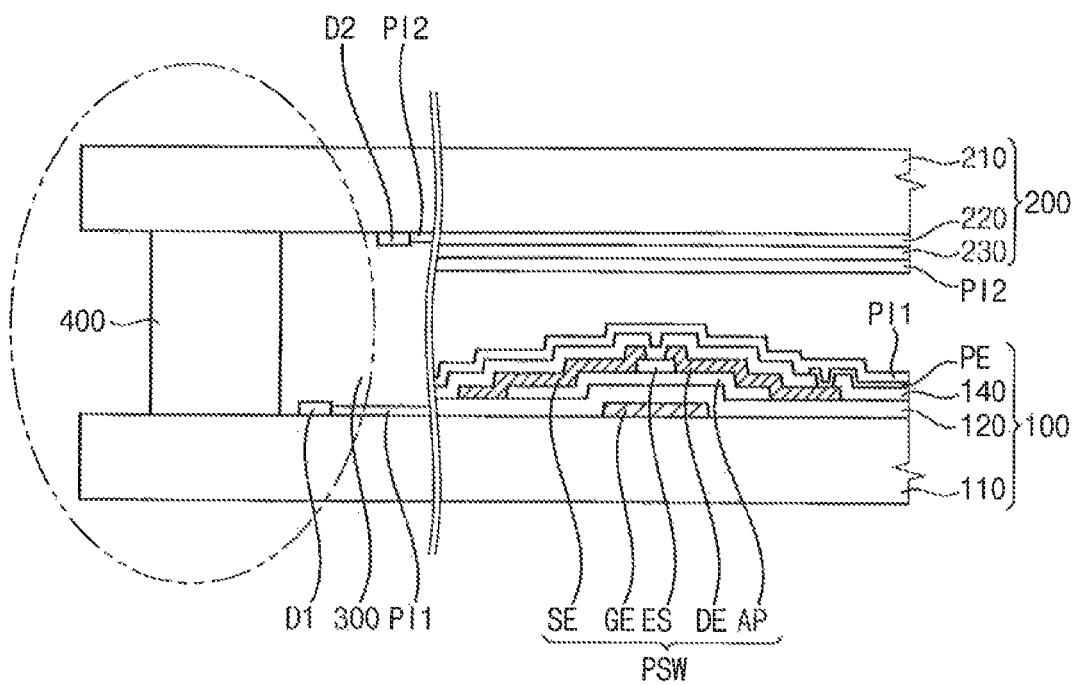
FIG. 1 is a cross-sectional view illustrating a display panel in accordance with an exemplary embodiment.

Exemplary embodiments of the present invention will be described below in detail with reference to the accompanying drawings. However, the present invention may be embodied in different forms and should not be construed as limited to the embodiments set forth herein. In the drawings, the thickness of layers and regions may be exaggerated for clarity. It will also be understood that when an element is referred to as being "on" another element or substrate, it may be directly on the other element or substrate, or intervening layers may also be present. Like reference numerals may refer to the like elements throughout the specification and drawings.

FIG. 1 is a cross-sectional view illustrating a display panel in accordance with an exemplary embodiment.

Referring to FIG. 1, the display panel according to an exemplary embodiment includes a first substrate 100, a second substrate 200, a liquid crystal layer 300 and a sealant 400.

A pixel array may be formed on a first base substrate 110 to form the first substrate 100. The pixel array may include a pixel transistor PSW and a pixel electrode PE. The pixel electrode PE may be connected to the pixel transistor PSW.

The first base substrate 110 may be a plastic substrate. For example, the first base substrate 110 may include kapton, polyethersulphone (PES), polycarbonate (PC), polyimide (PI), polyethyleneterephthalate (PET), polyethylenenaphthalate (PEN), polyacrylate (PAR), and fiber reinforced plastic (FRP), etc. Alternatively, the first base substrate 110 may be a glass substrate.

The pixel transistor PSW may include a gate electrode GE, which may be connected to a gate line, a source electrode SE which may be connected to the data line DL, a drain electrode DE, which may be spaced apart from the source electrode SE, and a semiconductor pattern AP.

The semiconductor pattern AP may be overlapped with the gate electrode GE, and may be disposed, at least in part, on the gate electrode GE. The semiconductor pattern AP may include an oxide. A transistor using an oxide semiconductor may be formed at a low temperature. Thus, the transistor may be used for manufacturing a plastic array substrate. Alternatively, the semiconductor pattern AP may include amorphous silicon, or polycrystalline silicon, etc.

For example, the semiconductor pattern AP may include indium oxide, zinc oxide, tin oxide or gallium oxide. The semiconductor pattern AP may include a multi-component semiconductor such as indium-zinc oxide or indium-zinc-gallium oxide, etc.

The semiconductor pattern AP may further include a dopant such as lithium (Li), sodium (Na), potassium (K), rubidium (Rh), cesium (Cs), beryllium (Be), magnesium (Mg), calcium (Ca), strontium (Sr), aluminum (Al), barium (Ba), titanium (Ti), zirconium (Zr), hafnium (Hf), vanadium (V), yttrium (Y), niobium (Nb), tantalum (Ta), chromium (Cr), molybdenum (Mo), tungsten (W), manganese (Mn), technetium (Tc), rhenium (Re), iron (Fe), ruthenium (Ru), osmonium (Os), cobalt (Co), rhodium (Rh), iridium (Ir), nickel (Ni), palladium (Pd), platinum (Pt), copper (Cu), silver (Ag), gold (Au), cadmium (Cd), mercury (Kg), boron (B), gallium (Ga), indium (In), thallium (Tl), silicon (Si), germanium (Ge), tin (Sn), lead (Pb), phosphorus (P), arsenic (As), bismuth (Bi), lanthanum (La), cerium (Ce), gadolinium (Gd), neodymium (Nd), tellurium (Te), scandium (Sc), polonium (Po), praseodymium (Pr), terbium (Tb), dysprosium (Dy), holmium (Ho), europium (Eu), erbium (Er) and/or ytterbium (Yb). The dopants may be used alone or in a combination.

The semiconductor pattern AP may be formed using a chemical vapor deposition (CVD) process, a sputtering process or a solution process using a composition.

Each of the source electrode SE and the drain electrode DE may be formed on the semiconductor pattern AP. The semiconductor pattern AP may be damaged by an etchant or a strip solution in the process of forming the source electrode SE and the drain electrode DE. Thus, a first etch stopper ES may be formed on the semiconductor pattern AP such that the semiconductor pattern AP may be prevented from being exposed through a gap between the source electrode SE and the drain electrode DE. The source electrode SE and the drain electrode DE may be partially formed on the first etch stopper ES. However, the first etch stopper ES may be omitted depending on the kind of an oxide semiconductor and/or the process for forming an oxide semiconductor.

The source electrode SE may be overlapped with a first end portion of the semiconductor pattern AP. The drain electrode DE may be overlapped with a second end portion of the semiconductor pattern AP. A contact resistance between the semiconductor pattern AP and the source electrode SE and between the semiconductor pattern AP and the drain electrode DE may be reduced when the semiconductor pattern includes amorphous silicon. Thus, an ohmic contact layer need not be formed. Alternatively, an additional ohmic contact layer (not illustrated) may be formed to minimize contact resistance.

The drain electrode DE may be in contact with the pixel electrode PE, so that the pixel transistor PSW may be electrically connected to the pixel electrode PE.

The first substrate 100 may farther include a gate insulating layer 120 and a passivation layer 140. The gate insulating layer 120 may be formed on the first base substrate 110 on which the gate electrode GE is formed.

The gate insulating layer 120 may include a nitride layer and/or an oxide layer. The passivation layer 140 may be formed on the source electrode SE and the drain electrode DE. The passivation layer 140 may be formed of, but is not limited to, a nitride, an oxide, or an oxynitride.

The pixel electrode PE may be formed on the passivation layer 140. The pixel electrode PE may be in contact the drain electrode DE through a contact hole. The contact hole may penetrate the passivation layer 140. The pixel electrode PE may include transparent conductive oxide. The pixel electrode PE may include indium tin oxide (ITO), indium zinc oxide (IZO), etc.

A first aligned layer PI1 may be formed on the pixel electrode PE and the passivation layer 140. The first aligned layer PI1 may be formed by using an aligning agent. The aligning agent may be coated on the first substrate 100. After that, the aligning agent may be dried to form the first aligned layer PI1.

Referring to FIG. 1, a second substrate 200 includes a second base substrate 210, a color filter layer 220, which is formed on the second base substrate 210, and a common electrode 230, which is formed on the color filter layer 220.

A second aligned layer PI2 may be formed on the common electrode 230. The second aligned layer PI2 may be formed by using an aligning agent. The aligning agent may be coated on the second substrate 200. After that, the aligning agent may be dried to form the second aligned layer PI2.

Although it is not illustrated in the figures, the second substrate 200 may further include a black matrix, or an overcoating layer to compensate for a height difference. Alternatively, a color filter layer and/or a common electrode may be formed on the first substrate.

The second base substrate 210 may be a plastic substrate, which is similar to the first base substrate 110. For example, the first base substrate 110 may include kapton, polyethersulphone (PES), polycarbonate (PC), polyimide (PI), polyethyleneterephthalate (PET), polyethylenenaphthalate (PEN), polyacrylate (PAR), and fiber reinforced plastic (FRP), etc. Alternatively, the first base substrate 310 may be a glass substrate.

Referring to FIG. 1, a column spacer dam D1 may be formed on the first base substrate 110, so that an aligning agent need not be coated on a whole surface of the first base substrate 110. Furthermore, a color filter dam D2 may be formed on the second base substrate 210, so that an aligning agent need not be coated on a whole surface of the second base substrate 230.

Generally, the aligning agent may include a hydrophilic material. For example, the aligning agent may include a polyimide PI. The sealing composition may include a hydrophobic material. Therefore, when the sealing composition for forming the sealant 400 is disposed on an aligned layer, an adhesion between the sealant 400 and a substrate decreases.

The column spacer dam D1 on the first base substrate 110 and the color filter dam D2 on the second base substrate 210 may prevent the adhesion between the sealant 400 and the first and second base substrate 110 and 210 from decreasing.

A liquid crystal layer 300 may be formed between the first substrate 100 and the second substrate 200. An arrangement of a liquid crystal molecule in the liquid crystal layer 300 is controlled by an electric field, so that a light transmittance of a pixel may be controlled.

A sealing composition may be coated on a peripheral area of the first substrate 100 to form the sealant 400.

In accordance with an exemplary embodiment, the sealant 400 may be in contact with the first base substrate 110 and the second base substrate 210. Alternatively, the gate insulating layer 120 may remain on the peripheral area, thus the sealant 400 may be formed on the gate insulating layer 120.

The sealant 400 may surround a display area on which the pixel is formed. A liquid crystal may be injected after the first substrate 100 and the second substrate 200 are combined to each other.

Figure 2:
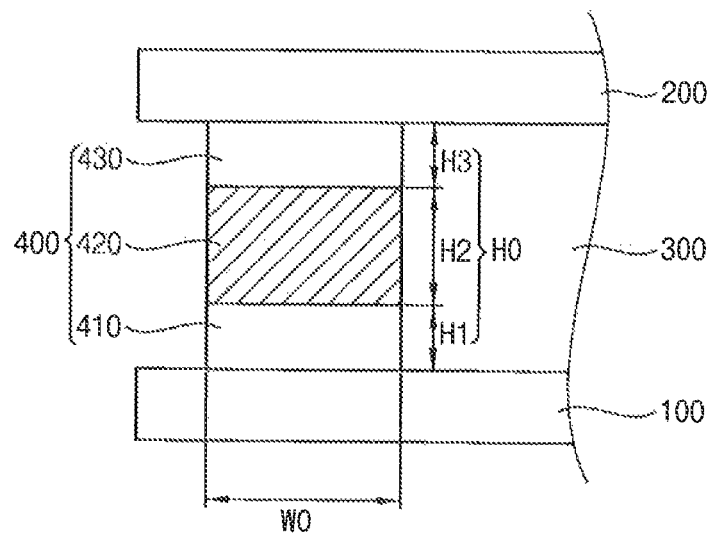
FIGS. 2 and 3 are enlarged cross-sectional views illustrating the display panel illustrated in FIG. 1 in accordance with an exemplary embodiment.
Figure 3:
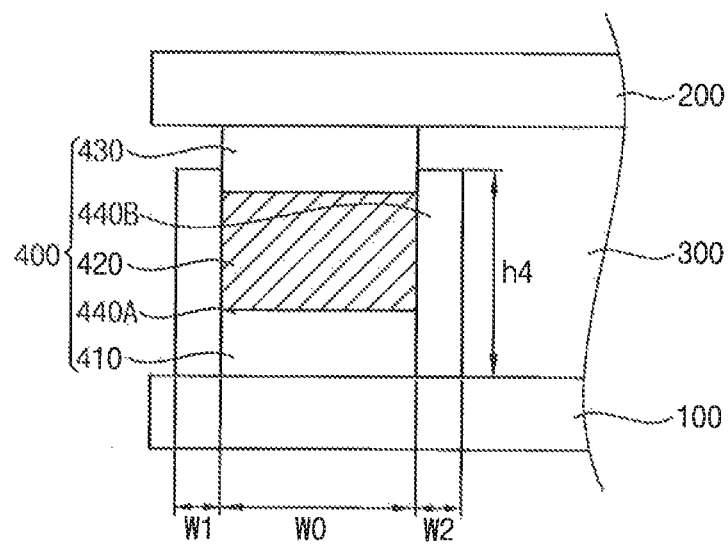

FIGS. 2 and 3 are enlarged cross-sectional views illustrating the display panel illustrated in FIG. 1 in accordance with an exemplary embodiment.

Referring to FIGS. 1 to 3, the sealant 400 in accordance with an exemplary embodiment may be multi-layered.

The multi-layered sealant includes a first sealant layer 410, a second sealant layer 420 and a third sealant layer 430.

The first sealant layer 430 may be formed on a peripheral area of the first substrate 100. The first sealant layer 410 may be formed using a first sealing composition. The first sealing composition may include an acrylate resin having a functional group having at least 3 carbon atoms.

The second sealant layer 420 may be formed on the first sealant layer 410. The second sealant layer 420 may be formed on the first sealant layer 410. The second sealant layer 420 may be formed using a second sealing composition. The second sealing composition may include a modified epoxy resin having a (meth)acrylate group.

The third sealant layer 430 may be formed on the second sealant layer. The third sealant layer 430 may be formed on the second sealant layer 420. The third sealant layer 430 may be formed from the first sealing composition.

The multi-layered sealant 400 may have at least 2 layers to reduce moisture permeability compared to a single-layered sealant. When the multi-layered sealant 400 may have at least 2 layers, the multi-layered sealant 400 have a boundary surface between the layers thereof. Due to the boundary, absorption of water may be decreased, and the solubility of the water in the multi-layered sealant 400 may be decreased. Thus, the multi-layer sealant 400 may be less permeable to moisture.

Hereinafter, a first sealing composition forming the first sealant layer 410 and the third sealant layer 430, and a second sealing composition forming the second sealant layer 420 will be described more fully.

The first sealant layer 410 and the third sealant layer 430 may be formed of a first sealing composition. The first sealing composition may include about 10% by weight to about 40% by weight of a modified epoxy resin including an acrylate group, about 2% by weight to about 10% by weight of an acrylate resin including a functional group having at least 3 carbon atoms, about 10% by weight to about 40% by weight of an acrylate monomer, about 1% by weight to about 10% by weight of a heat-curing agent, about 1% by weight to about 10% by weight of a photo-polymerization initiator, about 10% by weight to about 50% by weight of a filler and about 10% by weight to about 30% by weight of a solvent.

The second sealant layer 420 may be formed of a second sealing composition. The second sealing composition may include about 10% by weight to about 40% by weight of a modified epoxy resin including a (meth)acrylate group, about 2% by weight to about 10% by weight of an acrylate resin including at least 3 functional groups having at least 5 carbon atoms, about 10% by weight to about 40% by weight of an acrylate monomer, about 1% by weight to about 10% by weight of a heat-curing agent, about 1% by weight to about 10% by weight of a photo-polymerization initiator, about 10% by weight to about 50% by weight of a filler and about 10% by weight to about 30% by weight of a solvent.

Modified Epoxy Resin Including an Acrylate Group

The first sealing composition may include the modified epoxy resin including the acrylate group.

The modified epoxy resin having an acrylate group may serve as a binder in the first sealing composition. The modified epoxy resin having an acrylate group may have an acrylate group and an epoxy group. The modified epoxy resin may react with both the photo-curing acrylate monomer and the heat-curing agent.

The modified epoxy resin having an acrylate group may include a bisphenol A-based epoxy resin, a bisphenol F-based epoxy resin, a novolac-based epoxy resin, a brominated epoxy resin, a cycloaliphalic-based epoxy resin, a rubber-based epoxy resin, an aliphatic polyglycidyl-based epoxy resin, a glycidyl amine-based epoxy resin, a biphenyl-based epoxy resin, a naphthalene-based epoxy resin, a tris-phenol methane-based epoxy resin, or a combination thereof.

The first sealing composition may have various viscosity according to the amount of the modified epoxy resin having an acrylate group. The amount may be a relative weight percent of the modified epoxy resin having an acrylate group based on the total weight of the first sealing composition. For less than about 10% by weight of the modified epoxy resin having acrylate group, the first sealing composition may be viscous such that a coated layer of the first sealing composition is difficult to have a fixed shape. For greater than about 40% by weight of the modified epoxy resin having acrylate group, the first sealing composition may be less viscous such that a coated layer of the first sealing composition is difficult to make a predetermined shape when the first sealing composition is provided to the substrate 100. Thus, an amount of the modified epoxy resin having an acrylate group may be about 10% by weight to about 40% by weight, based on the total weight of the first sealing composition.

Modified Epoxy Resin Including a (Meth)Acrylate Group

The second sealing composition may include the modified epoxy resin including the (meth)acrylate group.

The modified epoxy resin having a (meth)acrylate group may serve as a binder in the second sealing composition. The modified epoxy resin having a (meth)acrylate group may have a (meth)acrylate group and an epoxy group. The modified epoxy resin may react with both the photo-curing acrylate monomer and the heat-curing agent.

The modified epoxy resin having a (meth)acrylate group may include a bisphenol A-based epoxy resin, a bisphenol F-based epoxy resin, a novolac-based epoxy resin, a brominated epoxy resin, a cycloaliphatic-based epoxy resin, a rubber-based epoxy resin, an aliphatic polyglycidyl-based epoxy resin, a glycidyl amine-based epoxy resin, a biphenyl-based epoxy resin, a naphthalene-based epoxy resin, a tris-phenol methane-based epoxy resin, or a combination thereof.

Alternatively, the modified epoxy resin having a (meth)acrylate group may include resins of YD-128 Series, YDF-170 Series, YDB Series, YDCN Series, YH-434 Series, YD-171 Series, YD-128, YD-115, YDC-1312, YLSV-S0XY, YLSV-120TE, KSR-177, KSR-176X90, and KSR-276M7G.

The second sealing composition may have various viscosity according to the amount of the modified epoxy resin having a (meth)acrylate group. The amount may be a relative weight percent of the modified epoxy resin having a (meth)acrylate group based on the total weight of the second sealing composition. For less than about 10% by weight of the modified epoxy resin having a (meth)acrylate group, the second sealing composition may be viscous such that a coated layer of the modified epoxy resin having a (meth)acrylate group is difficult to have a fixed shape. For greater than about 40% by weight of the modified epoxy resin having a (meth)acrylate group, the second sealing composition may be less viscous such that a coated layer of the second sealing composition is difficult to make a predetermined shape when the second sealing composition is provided to the substrate 100. Thus, an amount of the modified epoxy resin having a (meth)acrylate group may be about 10% by weight to about 40% by weight, based on the total weight of the second sealing composition.

Acrylate Monomer

The first sealing composition and the second sealing composition may include the acrylate monomer.

The acrylate monomer may react with the modified epoxy resin by light-exposure so that the first sealing composition and the second sealing composition may be cured or hardened.

The photo-curing acrylate monomer may include dipentaerythritol hexaacrylate, dicyclopentadiene acrylate, dicyclopentadiene methacrylate, trismethylpropane triacrylate, glycidyl methacrylate, diethylene glycol dimethacrylate, ethylene glycol acrylate, ethylene glycol dimethacrylate or a combination thereof.

The performance of an acrylate monomer in curing a sealing composition in response to light may depend on the amount of the acrylate monomer in a sealing composition. The amount may be a relative weight percent of the acrylate monomer based on the total weight of the sealing composition. For less than about 10% by weight, the amount of the acrylate monomer is not sufficient for the acrylate monomer to cure the sealing composition coated on the substrate 300. For greater than about 40% by weight, the amount of the acrylate monomer may cause the sealing composition to be unstable and less viscous. Thus, an amount of the photo-curing acrylate monomer may be about 10% by weight to about 40% by weight, based on the total weight of the sealing composition.

Acrylate Resin Including a Functional Group Having at Least 3 Carbon Atoms

The first sealing composition may include the acrylate resin including a functional group having at least 3 carbon atoms to improve an adhesion. For example, the acrylate resin may include a functional group having 3 to 10 carbon atoms.

For example, the first sealing composition may include an acrylate resin whose chemical formula is:

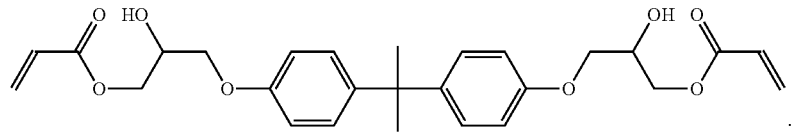 [SMILES: C=CC(=O)OCC(O)COc1ccc(C(C)(C)c2ccc(OCC(O)COC(=O)C=C)cc2)cc1]

The first sealing composition may include the acrylate resin including a functional group having at least 3 carbon atoms, so that a stress between the acrylate resins may be decreased. Thus, an adhesion between the first substrate 100 and the second substrate 200 may be increased.

When an amount of the acrylate resin is less than about 2% by weight, based on the total weight of the first sealing composition, forming a coating layer having a sufficient thickness may be difficult. When an amount of the modified epoxy resin having an acrylate group is greater than about 10% by weight based on the total weight of the first sealing composition, having a proper viscosity may be difficult. Thus, an amount of the modified epoxy resin having an acrylate group may be about 2% by weight to about 10% by weight, based on the total weight of the first sealing composition.

Acrylate Resin Including at Least 3 Functional Groups Having at Least 5 Carbon Atoms The second sealing composition may include the acrylate resin including at least 3 functional groups having at least 5 carbon atoms.

The acrylate resin including at least 3 functional groups having at least 5 carbon atoms may serve as a binder in the second sealing composition.

The acrylate resin may have the acrylate group. Thus, the acrylate resin may react with the photo-curing acrylate monomer. Furthermore, the acrylate resin includes a functional group having at least 5 carbon atoms, so that the acrylate resins may react with each other. Therefore, the second sealant layer 420 may be cured.

The acrylate resin may include at least 5 carbon atoms to form a long side chain. Therefore, a stress between the acrylate resins may be decreased. Thus, the second sealing composition may be less permeable to moisture.

For example, the second sealing composition may include an acrylate resin whose chemical formula is:

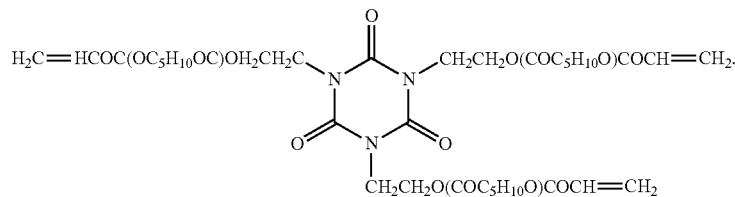

When an amount of the acrylate resin is less than about 2% by weight, based on the total weight of the second sealing composition, forming a coating layer having a sufficient thickness may be difficult. When an amount of the modified epoxy resin having an acrylate group is greater than about 10% by weight, based on the total weight of the second sealing composition, having a proper viscosity may be difficult. Thus, an amount of the modified epoxy resin having an acrylate group may be about 2% by weight to about 10% by weight, based on the total weight of the second sealing composition.

Heat-Curing Agent

The first sealing composition and the second sealing composition may include the heat-curing agent. The heat-curing agent may react with the modified epoxy resin including the acrylate group, modified epoxy resin including the (meth) acrylate group, the acrylate resin including at least 3 functional groups having at least 5 carbon atoms by heating, to thereby cure the sealing compositions.

The heat-curing agent may include an amine curing agent, an acid anhydride curing agent, and an imidazole curing agent. The heat-curing agent may be selected according to the temperature of the heat-curing process.

The heat-curing agent may include diamino diphenyl methane (DDM), diamino diphenyl sulfone (DDS), tetrahydrophthalic anhydride (THPA), hexahydrophthalic anhydride (HHPA), methyltetrahydrophthalic anhydride (MeTHPA), nadic methyl anhydride (NMA), hydrolized methylnadic anhydride (HNMA), phthalic anhydride (PA), 2-phenyl-4-methyl-hydroxymethylimidazole, 3-(3,4-dichlorophenyl)-1, 1-dimethyiurea (DCMU), a sulfonium salt, a phosphonium salt, a biphenyl ether block carbonic acid, an activated ether of polycabonic acid, 1-cyanoethyl 2-phenyl imidazole (TCI), 1,1-dimethoxy-N,N-dimethyl methanamine, 1-phenylethylamine, 2-(diethoxylamino)ethylamine, 2-phenylethylamine, 3-methoxypropylamine, butylamine, cyclohexylamine, 1-phenylpropylamine, di(2-ethylhexyl)amine, dibutylamine, diethylamine, diethyleuetriamine, dimethylethylamine, dipropylamine, dipropylene triamine, isopropylamine, N,N-bis-(3-aminopropyl)methylamine, N,N-dimethylisopropylamine, N-ethyldiisopropylamine, N-octylamine, N-3-amine-3-(2-aminoethylamino)propylamine, propylamine, tributylamine, tripropylamine, tris-(2-ethylhexyl)amine, tert-butylamine, diisopropanolamine, methyldiethanolamine. N,N-dimethylisopropanolamine, N-methylethalonamine, 2,6-xyldine, N-ethyl-N-(2-hydroxyethyl)aniline, ethylenediamine, isophorone diamine, ethyletanolamine, N-(2-aminoethyl)ethanolamine, triisopropanolamine, diethylenetriamine, ethylenediamine, N-(2-aminethyl)ethanolamine, 1-methoxyimidazole, 1-vinylimidazole, N,N-dimethylisopropanolamine, N-ethyl-N-(2-hydroxyethyl)aniline, 1-methylimidazole, N,N-dimethylcyclohexylamine, or trimethylaminoethylethanolamine.

When an amount of the heat-curing agent is less than about 1% by weight, based on the total weight of the sealing composition, the stability of a coating layer may be decreased. When an amount of the heat-curing agent is greater than about 10% by weight, based on the total weight of the sealing composition, the flexibility of a coating layer may be decreased. Thus, an amount of the heat-curing agent may be about 1% by weight to about 10% by weight, based on the total weight of the sealing composition.

Photo-Polymerization Initiator

The first sealing composition and the second sealing composition may include the photo-polymerization initiator. The photo-polymerization initiator may be decomposed by light to form a radical. The photo-polymerization initiator may serve to activate photo-polymerization of the photo-curing acrylate monomer.

The photo-polymerization initiator may include a benzoin compound, an acetophenone compound, a diethoxy acetophenone compound, a hydroxyl acetophoenone compound, a benzophenone compound, a thioxanthone compound, an anthraquinone compound, an á-acyloxim ester compound, a phenyl glyoxylate compound, a benzyl compound, an azo compound, a diphenyl sulphide compound, an acylphosphine oxyl compound, an organic pigment compound, an iron-phthalocyanine compound, or a combination thereof.

Alternatively, the photo-polymerization initiator may include 1-phenyl-2-hydroxy-2-methyl propane-1-one, 1-hydroxy cyclohexyl phenyl ketone, amino acetophenone, benzyl dimethyl ketal, benzoin ether, thioxanthone, 2-ethylanthraquinone(2-ETAQ), camphorquinone, á-naphtol, 2,4-diethylthioxanthone, trimethylbenzoyl diphenylphosphine oxide, benzophenone, and 2,2-diethoxyacetophenone, or benzoloilisopropyl ether.

Alternatively, the photo-polymerization initiator may include Irgacure 149, Irgacure 184, Irgacure 369, Irgacure 379, Irgacure 500, Irgacure 651, Irgacure 784, Irgacure 819, Irgacure 907, Irgacure 1700, Irgacure 1800, Irgacure 1850, Irgacure 2959, Irgacure 1173, Darocur 1173, Darocur 4265, or Irgacure OXE02.

When an amount of the photo-polymerization initiator is less than about 1% by weight based on the total weight of the sealing composition, photo-curing may not be performed. When an amount of the photo-polymerization initiator is greater than about 10% by weight, based on the total weight of the sealing composition, the flexibility of a coating layer may decrease. Thus, an amount of the photo-polymerization initiator may be about 1% by weight to about 1.0% by weight, based on the total weight of the sealing composition.

Filler

The first sealing composition and the second sealing composition may include the filler. The filler may prevent softening of a sealing member, which may occur when the sealing composition is heated. The filler may serve as a supporting member in the sealing member.

The filler may include an organic filler and/or an inorganic filler.

The organic filler may include poly methylmethacrylate, polystyrene or a copolymer of monomer capable of copolymerization.

The inorganic filler may include potassium carbonate, magnesium carbonate, barium sulfate, magnesium sulfate, iron oxide, titanium dioxide, zinc oxide, aluminum oxide, aluminum silicate, silicon dioxide, asbestos dust, quartz powder, glass fiber, mica, silica, diatomite, tin oxide, magnesium hydroxide, aluminum, hydroxide, magnesium carbonate, gypsum, calcium silicate, talc, glass bead, sericite, activated clay, bentonnite, aluminum nitride, silicon nitride, potassium titanate, zeolite, calcia, magnesia, ferrite, zerolite, aluminum stearate, aluminum hydroxide, or a combination thereof.

When the sealing composition includes the inorganic filler, the inorganic filler may include particles whose sizes are substantially uniform. For example, the particles of the inorganic filler may be less than about 5 μm in diameter. When particles of the inorganic filler are greater than about 5 μm in diameter, a display panel combined by the sealing composition may have non-uniform cell gaps.

When an amount of the filler is less than about 10% by weight based on the total weight of the sealing composition, substrate attachment stability may be decreased. When an amount of the filler is greater than about 50% by weight, based on the total weight of the sealing composition, flexibility may decrease and a cell gap of the display panel may not be uniform. Thus, the amount of the filler may be about 30% by weight to about 50% by weight, based on the total weight of the sealing composition.

Solvent

The solvent may control the viscosity of the sealing composition. Examples of the solvent may include N-methyl-2-pyrrolidone, gamma butyl lactone, butyl cellulose, propylene glycol monomethyl ether acetate, isopropyl acetate, butyl acetate, ethanol, and ethyl lactate.

When an amount of the solvent is less than about 10% by weight based on the total weight of the sealing composition, the viscosity of the sealing composition may excessively increase, such that the uniformity of the sealing member may be decreased. When an amount of the solvent is greater than about 30% by weight, based on the total weight of the sealing composition, achieving a proper thickness of the sealing member may be difficult. Thus, an amount of the solvent may be 10% by weight to about 30% by weight based on the total weight of the sealing composition.

Functional Silica

The first sealing composition and the second sealing composition may further include the functional silica. The sealing compositions may include at least 2 functional silicas, which have different diameters.

The functional silica may be formed of a silica nano particle.

An amine group may be combined with silica nano particle. Various functional groups may be combined with the amine group. For example, the functional group may be formed of a normal alkyl chain.

For example, the sealing compositions may include a first functional silica and a second functional silica. A diameter of the first functional silica may be within a range of about 0.5

μm to about 1.0 μm. A diameter of the second functional silica may be within a range of about 0.1 μm to about 0.4 μm.

The sealing composition may include the functional silica whose diameter is within a range of about 0.1 μm to about 0.4 μm. The sealing composition having the function silica may be less permeable to moisture. When the diameter of the functional silica decreases, a surface area of the functional silica may increase. Thus, an adhesion of the sealing composition to the substrate 100 may be increased. Furthermore, the increased surface area may increase a penetration path of moisture in the sealing composition, and thus the sealing composition may be less permeable to moisture.

The first sealing composition and the second sealing composition may further include about 1% by weight to about 10% by weight of a flexibility improving agent, about 0.5% by weight to about 8% by weight of a thixotropy controlling agent and about 0.01% by weight to about 3% by weight of a silane coupling agent.

The flexibility improving agent may serve to increase the flexibility of a sealant formed from the sealing compositions.

The flexibility improving agent may include a thermoplastic resin, a phenoxy resin, an elastomer, a reactive rubber, or a modified epoxy resin organic elastomer.

For example, the reactive thermo-plastic resin may include polyethylene, polypropylene, polyvinyl acetate, polystyrene, an acrylonitrile butadiene styrene (ABS) resin, or an acrylic resin.

For example, the elastomer may include polyisoprene, polyisobutylene, polybutadiene, polyvinyl chloride, polyurethane, or polysiloxane.

For example, the reactive rubber may include carboxylic acrylonitrile-butadiene rubber (xNBR), carboxyl-terminated butadiene acrylonitrile (CTBN), nitrile butadiene rubber, cis-isoprene rubber, or styrene butadiene rubber (SBR).

For example, the modified epoxy resin organic elastomer may include an epoxy group and an acrylate group. The weight-average molecular weight of the organic elastomer may be about 5,000 to about 25,000.

A weight-average molecular weight of the flexibility improving agent may be about 5,000 to about 50,000.

When an amount of the flexibility improving agent is less than about 1% by weight, based on the total weight of the sealing composition, the flexibility of a sealing member may be poor. When an amount of the flexibility improving agent is greater than about 10% by weight, based on the total weight of the sealing composition, flexibility may excessively be increased, so that a stable combination of substrates may be difficult. Thus, an amount of the flexibility improving agent may be about 1% by weight to about 10% by weight, based on the total weight of the sealing composition.

The thixotropy controlling agent may include methyl cellulose, methyl ethyl ketone peroxide, oxidized polyethylene-wax, modified polypropylene emulsion, polyamide wax, organic clay, alkyl sulfate, hydroxyl ethyl cellulose, hydroxyl acid esters, polyvinyl alcohol, polydimethyl siloxane, unsaturated carboxylic acid monomer, hydroxide carboxylic acid amide, ethylene glycol, diethylene glycol, triethylene glycol, alkali earth metal hydroxide, alkali earth metal carbonate or a combination thereof.

The silane coupling agent may serve to stabilize the first and the second sealing composition. For example, the silane coupling agent may include an inorganic compound with chemical formula $SiH_4$.

Hereinafter, a structural relationship of the sealant 400 will be described with reference to FIGS. 1 and 2. A width W0 of the multi-layered sealant 400 may be within a range of about 0.1 mm to about 1.0 mm.

When a width W0 of the multi-layered sealant 400 is less than about 0.1 mm, an adhesion between the sealant 400 and the first and the second substrate 100 and 200 may be poor. When a width W0 of the multi-layered sealant 400 is greater than 1.0 mm, a width of a black matrix and a bezel need not be substantially decreased.

A height H0 of the multi-layered sealant 400 may be within a range of about 2 μm to about 5 μm. For example, a height H1 of the first sealant layer 410 may be within a range of about 0.5 μm to about 1 μm. A height H2 of the second sealant layer 420 may be within a range of about 1 μm to about 3 μm. A height H3 of the third sealant layer 430 may be within a range of about 0.5 μm to about 1 μm.

A structure of the multi-layered sealant 400 according to an exemplary embodiment illustrated in FIG. 3 is substantially the same as the structure of the multi-layered sealant 400 illustrated in FIG. 2 except that the multi-layered sealant 400 of FIG. 3 may include a first dam 440A and a second dam 440B. Thus, the same reference numerals will be used to refer to the same or like parts as those described in FIG. 2 and any repetitive explanation concerning the above elements will be omitted.

Referring to FIGS. 1 and 3, the multi-layered sealant 400 may include the first dam 400A and the second dam 440B.

The first dam 440A may be disposed on an outer surface of the multi-layered sealant 400. The second dam 440B may be disposed on an inner surface of the multi-layered sealant 400.

The first sealant layer 410, the second sealant layer 420 and the third sealant layer 430 may be vertically laminated layer by layer. The first sealant layer 410, the second sealant layer 420 and the third sealant layer 430 are before hardened. Thus, the first dam 440A and the second dam 440B may prevent the sealant layers from flowing.

The first dam 440A and the second dam 440B may be formed using a material of the column spacer dam D1 and D2 or the color filter layer 220.

A width W1 of the first dam 440A and a width W2 of the second dam 440B may be within a range of about 0.2 mm to about 0.5 mm. When the width W1 of the first dam 440A and the width W2 of the second dam 440B are less than 0.2 mm, a structure of the first dam 440A and the second dam 440B may be collapsed, and so that the first and the second dam 440A and 440B does not serve to prevent the sealing composition from flowing. When the width W1 of the first dam 440A and the width W2 of the second dam 440B are greater than 0.5 mm, a black matrix and a bezel may be thick.

A height H4 of the first dam 440A and the second dam 440B may be within a range of about 1.5 μm to about 5 μm. When the height H4 of the first dam 440A and the second dam 440B is less than 1.5 μm, the sealing composition may flow over the first and the second dam 440A and 440B. When the height H4 of the first dam 440A and the second dam 440B is greater than 5 μm, a liquid crystal layer 300 may be thick, so that a thickness of a display panel may be increased.

Figure 4:
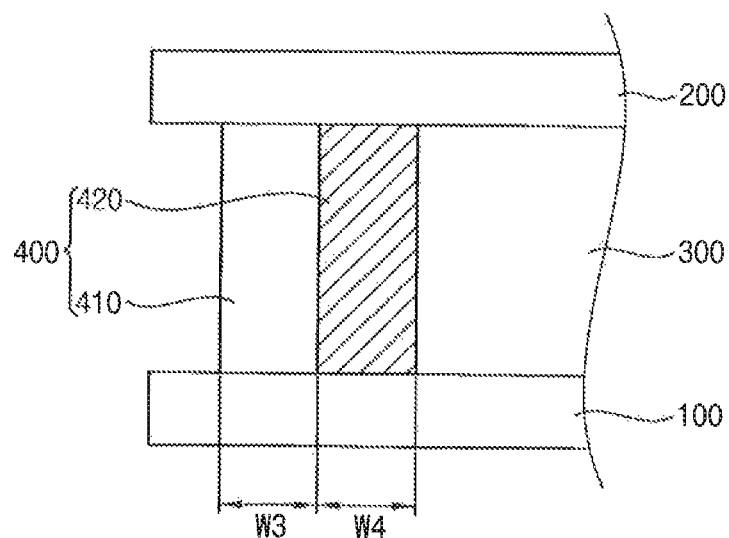
FIGS. 4 to 6 are enlarged cross-sectional views illustrating the display panel illustrated in FIG. 1 in accordance with an exemplary embodiment.
Figure 5:
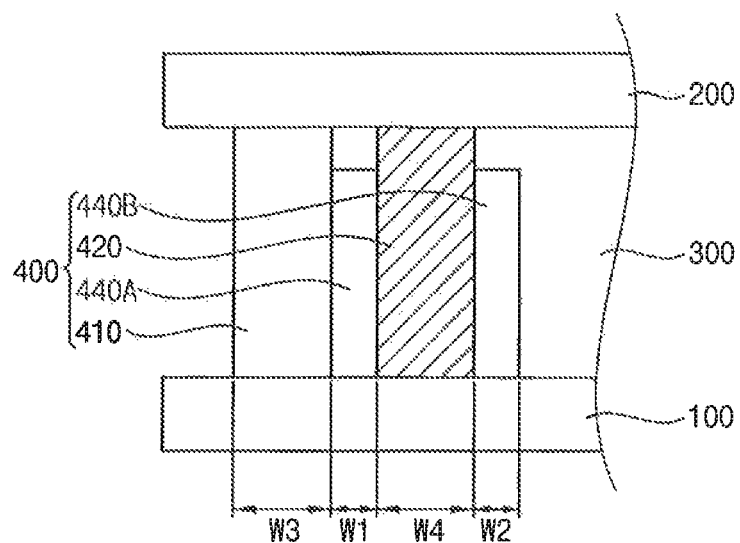
Figure 6:
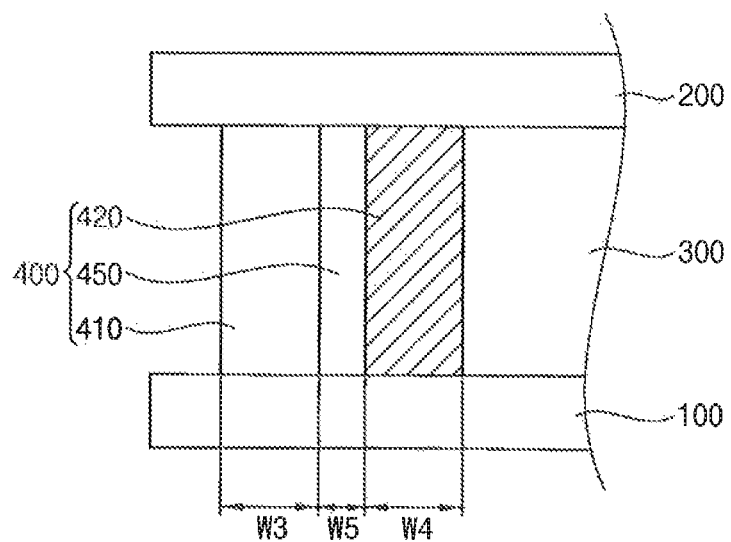

FIGS. 4 to 6 are enlarged cross-sectional views illustrating the display panel illustrated in FIG. 1 in accordance with an exemplary embodiment.

A first sealing composition and a second sealing composition according to an exemplary embodiment is substantially the same as the structure of the first sealing composition and the second sealing composition in FIGS. 2 and 3. Thus, the same reference numerals will be used to refer to the same or like parts as those described in FIGS. 2 and 3 and any repetitive explanation concerning the above elements will be omitted.

Referring to FIGS. 1 to 4, the multi-layered sealant 400 may include a first sealant layer 410 and a second sealant layer 420.

The first sealant layer 430 is disposed on both ends between the first substrate 100 and the second substrate 200. The second sealant layer 420 is disposed between the first sealant layer 410 and the liquid crystal layer 300.

A width W3 of the first sealant layer 410 may be within a range of about 0.1 mm to about 0.5 mm.

When the width W3 of the first sealant layer 410 is less than 0.1 mm, an adhesion of the first substrate 100 and the second substrate 200 may be poor. When a width W3 of the first sealant layer 410 is greater than 0.5 mm, a width of a black matrix and a bezel may be thick.

A width W4 of the second sealant layer 420 may be within a range of about 0.1 mm to about 0.5 mm.

When the width W4 of the second sealant layer 420 is less than 0.1 mm, the multi-layered sealant 400 may be permeable to moisture. A display panel may have a stain at an edge due the permeated moisture. When a width W4 of the second sealant layer 420 is greater than 0.5 mm, a width of a black matrix and a bezel may be thick.

Referring to FIGS. 1 to 5, a multi-layered sealant 400 may include a first sealant layer 410, a second sealant layer 420, a first dam 440A and a second dam 440B.

The first sealant layer 410, the second sealant layer 420 and the third sealant layer 430 are viscous before hardened. Thus, the first dam 440A and the second dam 440B may prevent the sealant layers from flowing.

The first dam 440A and the second dam 440B may be formed by a material of the column spacer dam D1 and D2 or the color filter 220.

A width W1 of the first dam 440A and a width W2 of the second dam 440B may be within a range of about 0.2 mm to about 0.5 mm. When the width W1 of the first dam 440A and the width W2 of the second dam 440B are less than about 0.2 mm, a structure of the first dam 440A and the second dam 440B may be collapsed, so that the first and the second dam 440A and 440B does not serve to prevent the sealing composition from flowing. When the width W1 of the first dam 440A and the width W2 of the second dam 440B are greater than 0.5 mm, a width of a black matrix and a bezel may be thick.

A height H4 of the first dam 440A and the second dam 440B may be within a range of about 1.5 μm to about 5 μm. When the height H4 of the first dam 440A and the second dam 440B is less than about 1.5 μm the sealing composition my flow over the first and the second dam 440A and 440B. When the height H4 of the first dam 440A and the second dam 440B is greater than about 5 μm, a liquid crystal layer 300 may be thick, so that a thickness of a display panel may be increased.

Referring to FIGS. 3 to 6, a multi-layered sealant 400 may include a first sealant layer 410, a second sealant layer 420 and an air layer 450.

The air layer 450 may be disposed between the first sealant layer 410 and the second sealant layer 420.

When the multi-layered sealant 400 includes the air layer 450, a boundary surface may increase compared to the multi-layered sealant 400 of FIG. 4. The multi-layered sealant 400 of FIG. 4 may include a boundary between the first sealant layer 410 and the second sealant layer 420 only. The multi-layered sealant 400 of FIG. 6 may include a first boundary between the first sealant layer 410 and the air layer 450, and a second boundary between the air layer 450 and the second sealant layer 420. The boundary surface may reduce the absorption of water, so that the solubility of the water in the multi-layered sealant 400 may be reduced compared to the multi-layered sealant 400 of FIG. 4. Thus, the sealant 400 may be less permeable to moisture.

A width W3 of the first sealant layer 410 may be within a range of about 0.1 mm to about 0.5 mm. A width W4 of the second sealant layer 420 may be within a range of about 0.1 mm to about 0.5 mm.

A width W5 of the air layer 450 may be within a range of about 0.02 mm to about 0.05 mm.

When the sealant 400 has the air layer 450 whose width is less than about 0.02 mm, the sealant 400 may be permeable to moisture. When the width W5 of the air layer 450 is greater than 0.05 mm, a black matrix and a bezel may be thick.

A ratio of the width W3 of the first sealant layer 410, the width W5 of the air layer 450 and the width of the second sealant layer 420 may be in a range of 1 to 3:0.5:1 to 2.

Figure 7:
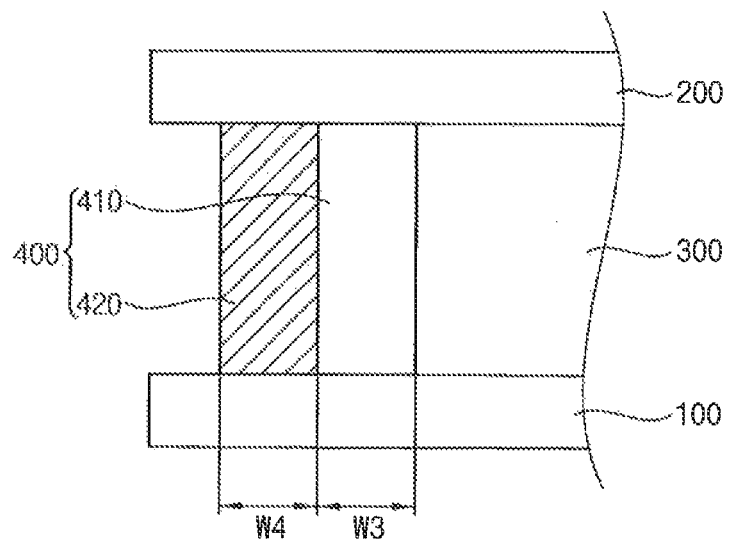
FIGS. 7 to 9 are enlarged cross-sectional views illustrating the display panel illustrated in FIG. 1 in accordance with an exemplary embodiment.
Figure 8:
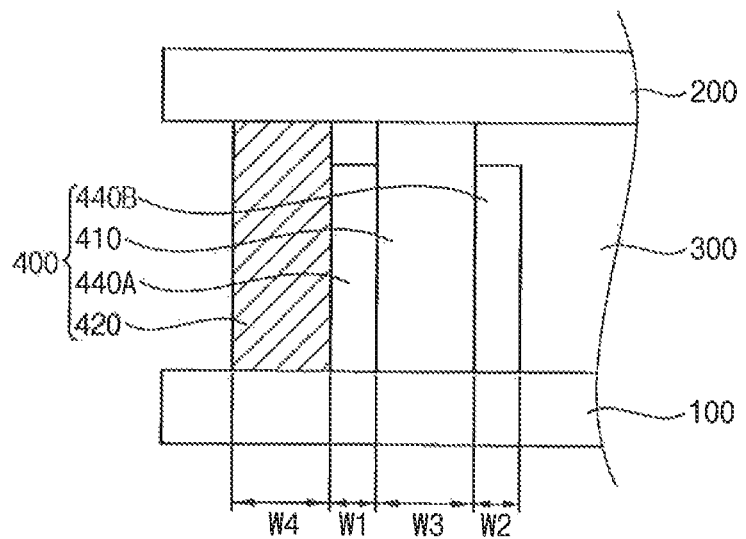
Figure 9:
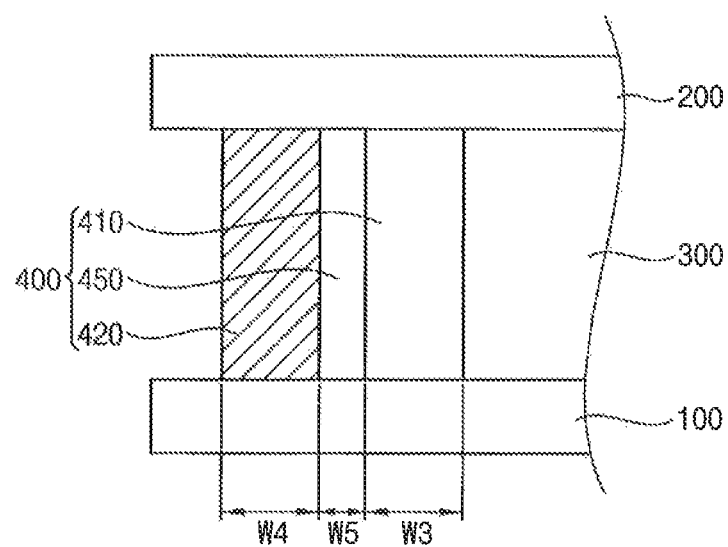

FIGS. 7 to 9 are enlarged cross-sectional views illustrating the display panel illustrated in FIG. 1 in accordance with an exemplary embodiment.

A first sealing composition and a second sealing composition according to an exemplary embodiment is substantially the same as the structure of the first sealing composition and the second sealing composition in FIGS. 2 and 3. Thus, the same reference numerals will be used to refer to the same or like parts as those described in FIGS. 2 and 3 and any repetitive explanation concerning the above elements will be omitted.

Referring to FIGS. 1 and 7, the multi-layered sealant 400 may include a first sealant layer 430 and a second sealant layer 420.

The first and the second sealant layer 430 and 420 may be disposed on each other side by side. The first and the second sealant layer 410 and 420 may interposed between the first substrate 300 and the second substrate 200. The first sealant layer 410 may be in contact with the liquid crystal layer 300.

A width W3 of the first sealant layer 410 may be within a range of about 0.1 mm to about 0.5 mm.

When the width W3 of the first sealant layer 430 is less than about 0.1 mm, an adhesion between the sealant 400 and the first and the second substrate 100 and 200 may be decreased. When a width W3 of the first sealant layer 430 is greater than about 0.5 mm, a black matrix and a bezel may be thick in width.

A width W4 of the second sealant layer 420 may be within a range of about 0.1 mm to about 0.5 mm.

When the width W4 of the second sealant layer 420 is less than about 0.1 mm, the multi-layered sealant 400 may be permeable to moisture, and thus a display panel may have a stain at its edge due to the moisture. When a width W4 of the second sealant layer 420 is greater than about 0.5 mm, a black matrix and a bezel may be thick in width.

Referring to FIGS. 3 and 8, the multi-layered sealant 400 may include a first sealant layer 430, a second sealant layer 420, a first dam 440A and a second dam 440B.

The first sealant layer 410, the second sealant layer 420 and the third sealant layer 430 may be viscous before hardened. Thus, the first dam 440A and the second dam 440B may prevent the sealant layers from flowing.

The first dam 440A and the second dam 440B may be formed by a material of the column spacer dam D1 and D2 or the color filter 220.

A width W1 of the first dam 440A and a width W2 of the second dam 440B may be within a range of about 0.2 mm to about 0.5 mm. When the width W1 of the first dam 440A and the width W2 of the second dam 440B are less than about 0.2 mm, a structure of the first dam 440A and the second dam 440B may be collapsed, so that the first and the second dam 440A and 440B do not prevent the sealing composition from flowing. When the width W1 of the first dam 440A and the width W2 of the second dam 440B are greater than about 0.5 mm, a black matrix and a bezel may be thick in width.

A height H4 of the first dam 440A and the second dam 440B may be within a range of about 1.5 μm to about 5 μm. When the height H4 of the first dam 440A and the second dam 440B is less than about 1.5 μm, the first and the second dam 440A and 440B do not prevent the sealing composition from flowing. When the height H4 of the first dam 440A and the second dam 440B is greater than about 5 μm, a liquid crystal layer 300 may be thick, so that a thickness of a display panel may be increased.

Referring to FIGS. 1 and 9, the multi-layered sealant 400 may include a first sealant layer 410, a second sealant layer 420 and an air layer 450.

The air layer 450 may be disposed between the first sealant layer 410 and the second sealant layer 420.

When the multi-layered sealant 400 includes the air layer 450, a boundary surface between different material layers may increase compared to a multi-layered sealant 400 having the first sealant layer 410 and the second sealant layer 420 only. The multi-layered sealant 400 may include a boundary surface between the first sealant layer 410 and the air layer 450, and a boundary surface between the air layer 450 and the second sealant layer 420. Such boundary may decrease absorption of water and thus the solubility of the water in the multi-layered sealant 400 decreases. Thus, the multi-layered sealant 400 may be less permeable to moisture when the multi-layered sealant 400 includes the air layer 450.

A width W3 of the first sealant layer 430 may be within a range of about 0.1 mm to about 0.5 mm. A width W4 of the second sealant layer 420 may be within a range of about 0.1 mm to about 0.5 mm.

A width W5 of the air layer 450 may be within a range of about 0.02 mm to about 0.05 mm.

When the width W5 of the air layer 450 is less than about 0.02 mm, the sealant 400 may be permeable to moisture. When the width W5 of the air layer 450 is greater than about 0.05 mm, a black matrix and a bezel may be thick in width.

A ratio of the width W3 of the first sealant layer 410, the width W5 of the air layer 450 and the width of the second sealant layer 420 may be at a range of about 3 to about 3: about 0.5: about 1 to about 2.

Hereinafter, a method for manufacturing a display panel according to exemplary embodiments will be described in detail with reference to the accompanying drawings.

Figure 10A:
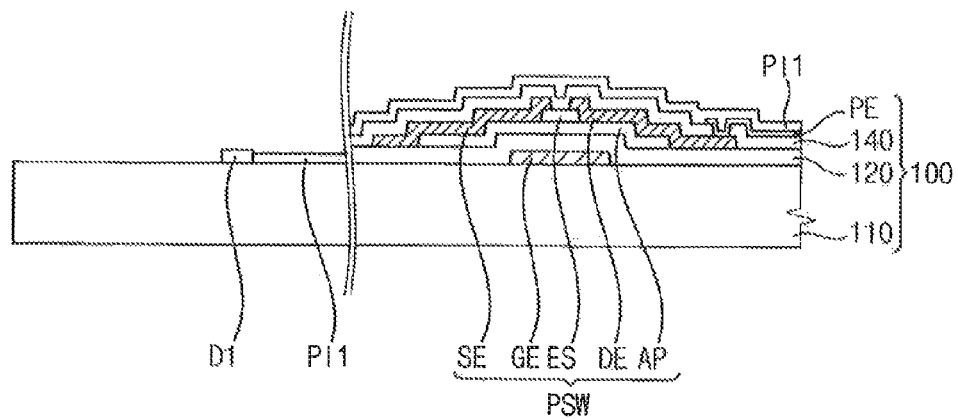
FIGS. 10A, 10B and 10D are cross-sectional views illustrating a method of manufacturing the display panel illustrated in FIG. 2 in accordance with an exemplary embodiment.
Figure 10B:
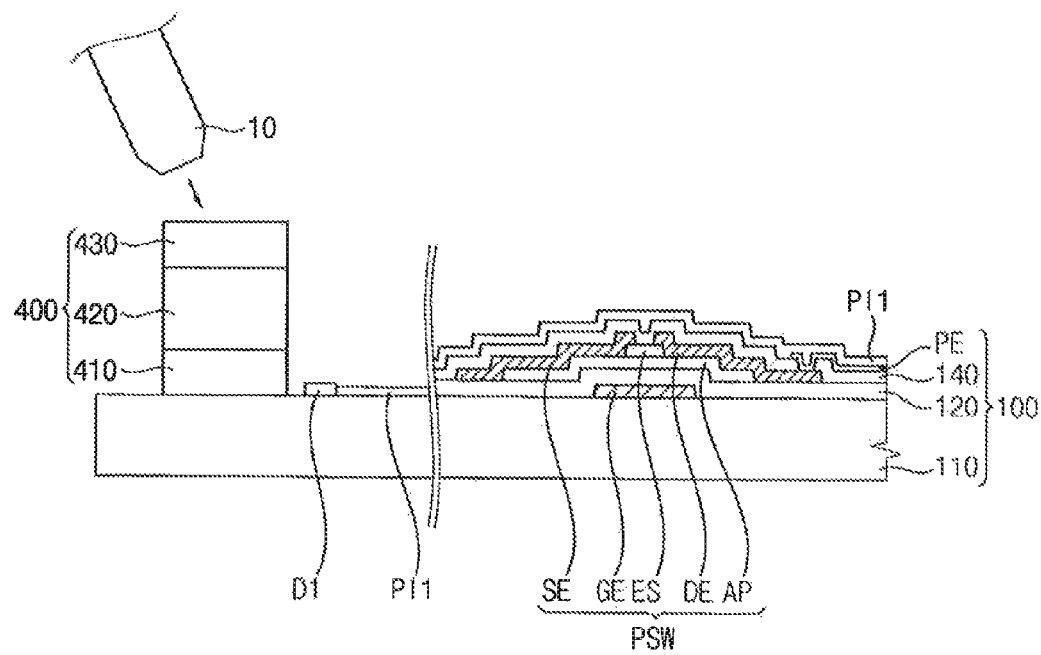
Figure 10C:
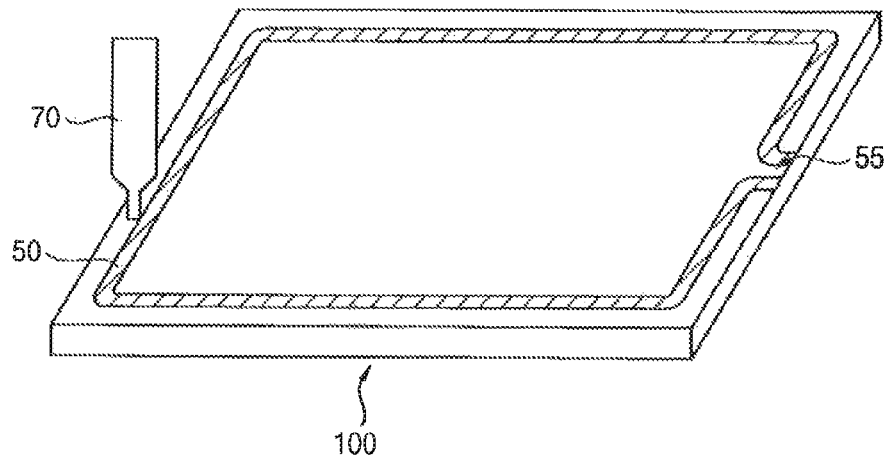
FIG. 10C is a perspective view illustrating a method of manufacturing the display panel illustrated in FIG. 2 in accordance with an exemplary embodiment.
Figure 10D:
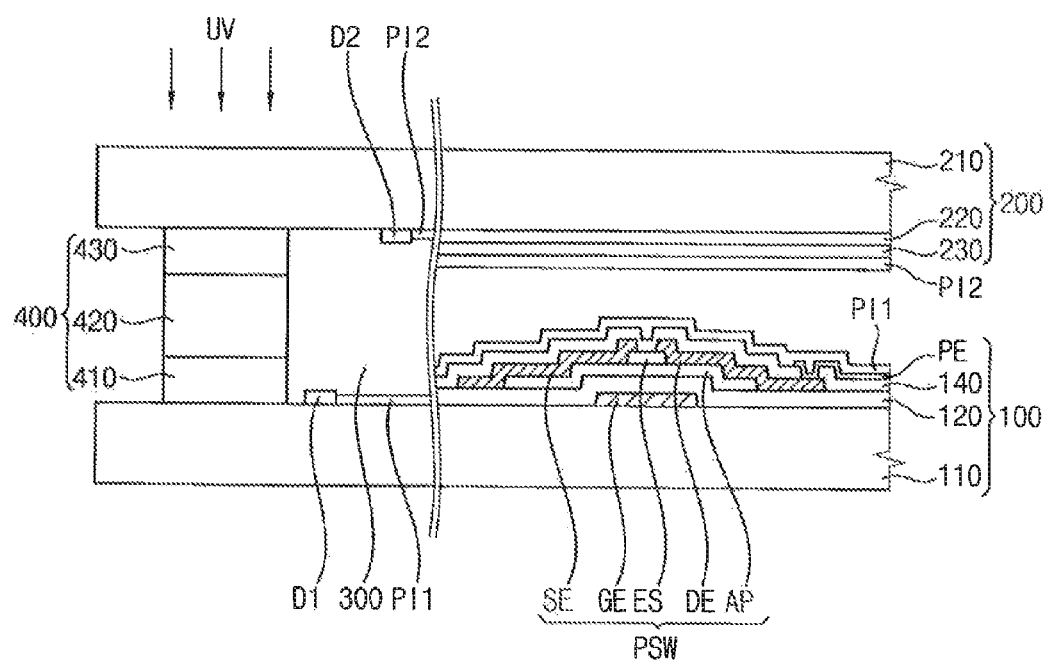

FIGS. 10A, 10B and 10D are cross-sectional views illustrating a method of manufacturing the display panel illustrated in FIG. 2 in accordance with an exemplary embodiment. FIG. 10C is a perspective view illustrating a method of manufacturing the display panel illustrated in FIG. 2 in accordance with an exemplary embodiment.

Referring to FIG. 30A, a pixel array may be formed on a first base substrate 110 to form the first substrate 100. The pixel array may include a pixel transistor PSW and a pixel electrode PE. The pixel electrode PE may be connected to the pixel transistor PSW.

The pixel transistor PSW may include a gate electrode GE, which may be connected to a gate line, a source electrode SE which may be connected to the data line DL, a drain electrode DE, which may be spaced apart from the source electrode SE, and a semiconductor pattern AP.

The first base substrate 110 may further include a gate insulating layer 120 and a passivation layer 140. The gate insulating layer 120 may be formed on the first base substrate 110 including the gate electrode GE.

The pixel electrode PE may be formed on the passivation layer 140.

The pixel array of FIG. 10A according to an exemplary embodiment is substantially the same as the pixel array illustrated in FIG. 1. Thus, the same reference numerals will be used to refer to the same or like parts as those described in FIG. 1 and any repetitive explanation concerning the above elements will be omitted.

Referring to FIGS. 10B and 10C, a sealing composition may be coated by a dispenser 10 in a peripheral area of the first substrate 100 to form a sealant 400.

In accordance with an exemplary embodiment, the sealing composition may be in contact with a first base substrate 110. Alternatively, a first aligned layer PI1 may be coated in the peripheral area, and the sealing composition may be provided on the first aligned layer PI1.

The sealant 400 may surround a display area having the pixel array, and may include a liquid crystal inlet 50 formed along the periphery of the first substrate 100. A liquid crystal may be injected through the liquid crystal inlet 50 after the substrates 100 and 200 are combined.

The sealing composition may include a first sealing composition, a second sealing composition and a third sealing composition.

The first sealing composition and the third sealing composition may include about 10% by weight to about 40% by weight of a modified epoxy resin including an acrylate group, about 2% by weight to about 10% by weight of an acrylate resin including a functional group having at least 3 carbon atoms, about 10% by weight to about 40% by weight of an acrylate monomer, about 1% by weight to about 10% by weight of a heat-curing agent, about 1% by weight to about 10% by weight of a photo-polymerization initiator, about 10% by weight to about 50% by weight of a filler and about 10% by weight to about 30% by weight of a solvent.

The second sealing composition may include about 10% by weight to about 40% by weight of a modified epoxy resin including a (meth)acrylate group, about 2% by weight to about 10% by weight of an acrylate resin including at least 3 functional groups having at least 5 carbon atoms, about 10% by weight to about 40% by weight of an acrylate monomer, about 1% by weight to about 10% by weight of a heat-curing agent, about 1% by weight to about 10% by weight of a photo-polymerization initiator, about 10% by weight to about 50% by weight of a filler and about 10% by weight to about 30% by weight of a solvent.

The sealing compositions may be substantially the same as the previously explained sealing compositions. Duplicated description of the sealing composition will be omitted.

Referring to FIG. 10D, a second substrate 200 may be disposed on the first substrate 100. The sealant 400 may be interposed between the first substrate and the second substrate 200. Light may be irradiated on the sealant 400 to cure or harden the sealant. The first substrate 100 and the second substrate 200 may be combined.

The sealing composition may contact a second base substrate 210 of the second substrate 200. Alternatively, a common electrode 230 may remain in the peripheral area, and the sealing composition may be in contact with the common electrode 230.

For example, when ultraviolet light is irradiated into the sealant 400, a photo-polymerization may be generated by a photo-polymerization initiator. Thus, the sealing composition may be cured.

Thereafter, the sealant 400 may be heated to induce heat-curing. Heating temperature may be in a range of about 110° C. to about 170° C. Thus, the sealant 400 may be further cured or hardened.

The second substrate 200 may include a second base substrate 210, a color filter layer 220 formed on the second base substrate 210 and a common electrode 230. The common electrode 230 may be formed on the color filter layer 220 to face the pixel array. Although it is not illustrated in figures, the second substrate 200 may also include an over-coating layer for compensating a step difference, and a black matrix. Alternatively, the color filter layer 220 and/or the common electrode 230 may be formed on the first substrate 100.

After the sealant 400 is formed, the liquid crystal is injected through the liquid crystal inlet 50 of the sealant 400. After the liquid crystal is injected, the liquid crystal inlet 50 is sealed.

Figure 11A:
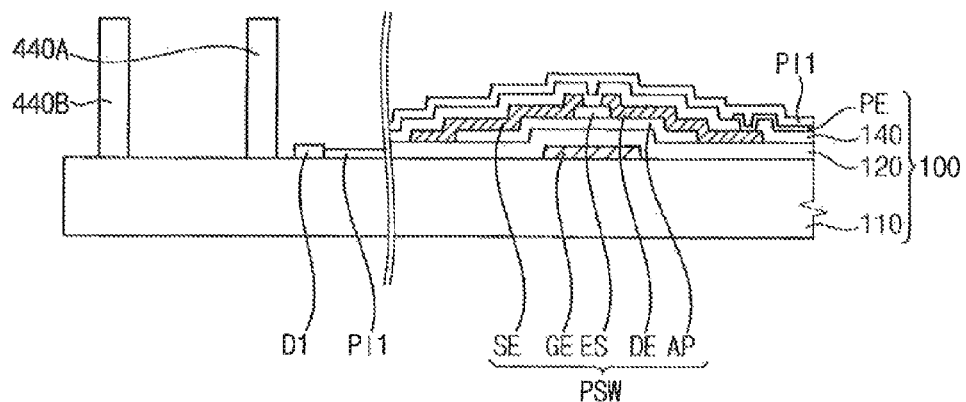
FIGS. 11A and 11B are cross-sectional views illustrating a method of manufacturing the display panel illustrated in FIG. 3 in accordance with an exemplary embodiment.
Figure 11B:
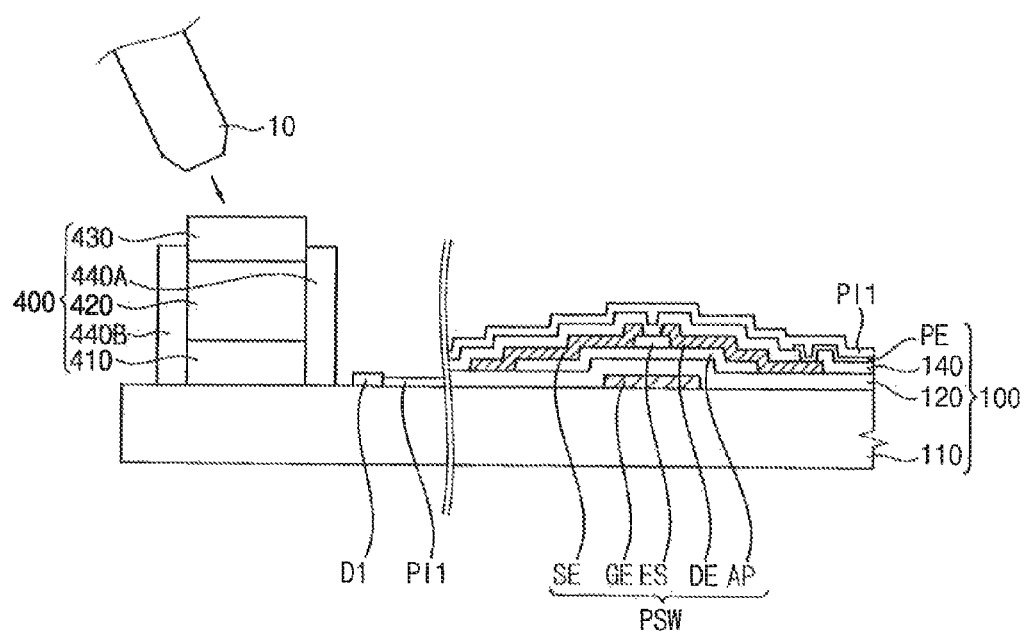

FIGS. 11A and 11B are cross-sectional views illustrating a method of manufacturing the display panel illustrated in FIG. 3 in accordance with an exemplary embodiment.

A pixel array of FIG. 11A according to an exemplary embodiment is substantially the same as the pixel array illustrated in FIG. 10A except a first dam 440A and a second dam 440B. Thus, the same reference numerals will be used to refer to the same or like parts as those described in FIG. 10A and any repetitive explanation concerning the above elements will be omitted.

Referring to FIG. 11A, the first dam 440A and the second dam 440B may be formed on the substrate 110. The first dam 440A and the second dam 440B may be form in the process step of forming the column spacer dam D1 and D2 and the color filter 220.

The first dam 440A and the second dam 440B may be formed by the material, which is substantially the same as a material of the column spacer dam D1 and D2 and the color filter 220.

A width W1 of the first dam 440A and a width W2 of the second dam 440B are within a range of about 0.2 mm to about 0.5 mm. When the width W1 of the first dam 440A and the width W2 of the second dam 440B are less than about 0.2 mm, a structure of the first dam 440A and the second dam 440B may be collapsed, so that the first and the second dam 440A and 440B do not prevent the sealing composition from flowing. When the width W1 of the first dam 440A and the width W2 of the second dam 440B are greater than about 0.5 mm, a black matrix and a bezel may be thick in width.

A height H4 of the first dam 440A and the second dam 440B is within a range of about 1.5 μm to about 5 μm. When the height H4 of the first dam 440A and the second dam 440B is less than about 1.5 the first and the second dam 440A and 440B does not prevent the sealing composition from flowing. When the height H4 of the first dam 440A and the second dam 440B is greater than about 5 μm, a liquid crystal layer 300 may be thick, so that a thickness of a display panel may be increased.

A pixel array of FIG. 11B according to an exemplary embodiment is substantially the same as the pixel array illustrated in FIG. 10B except a first dam 440A and a second dam 440B. Thus, the same reference numerals will be used to refer to the same or like parts as those described in FIG. 10B and any repetitive explanation concerning the above elements will be omitted.

Referring to FIG. 11B, the multi-layered sealant 400 may include a first sealant layer 410, a second sealant layer 420 and a third sealant layer 430. The first sealant layer 410, the second sealant layer 420 and the third sealant layer 430 may be laminated layer by layer.

The first sealant layer 410, the second sealant layer 420 and the third sealant layer 430 may be viscous before hardened. Thus, the first dam 440A and the second dam 440B may prevent the sealant layers from flowing.

Figure 12:
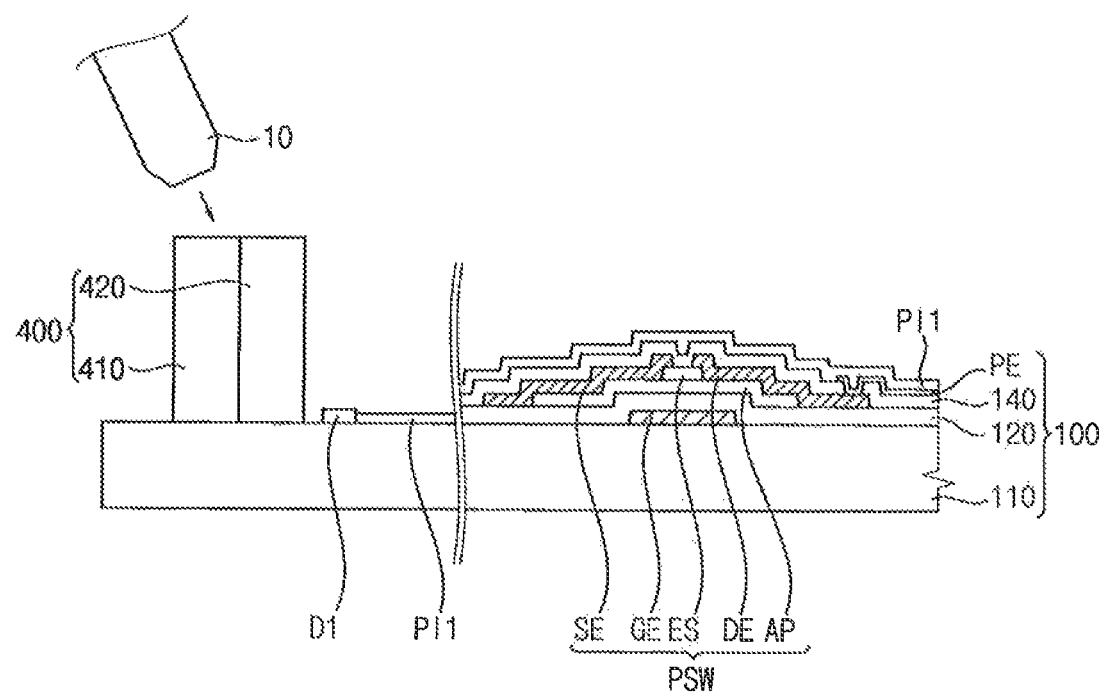
FIG. 12 is a cross-sectional view illustrating a method of manufacturing the display panel illustrated in FIG. 4 in accordance with an exemplary embodiment.

FIG. 12 is a cross-sectional view illustrating a method of manufacturing the display panel illustrated in FIG. 4 in accordance with an exemplary embodiment.

A pixel array of FIG. 12 according to an exemplary embodiment is substantially the same as the pixel array illustrated in FIG. 11B except a first sealing composition and a second composition are provided to the first substrate 110 at the same time. Thus, the same reference numerals will be used to refer to the same or like parts as those described in FIG. 11B and any repetitive explanation concerning the above elements will be omitted.

A multi-layered sealant 400 may include a first sealant layer 410 and a second sealant layer 420. The first sealing composition and the second sealing composition may be provided at the same time to form the first sealant layer 410 and the second sealant layer 420.

In exemplary embodiments as described above, a sealing composition is applied to a method of manufacturing a liquid crystal display apparatus. However, the sealing composition may be used for manufacturing of other flexible display apparatus, such as an organic light-emitting diode (OLED) display apparatus.

While the present inventive concept has been shown and described with reference to exemplary embodiments thereof, it will be apparent to those of ordinary skill in the art that various changes in form and detail may be made therein without departing from the spirit and scope of the inventive concept as defined by the following claims.

What is claimed is:

1. A display panel, comprising:
   a first substrate including a display area and a peripheral area, the peripheral area surrounding the display area;
   a second substrate disposed on the first substrate, facing the first substrate along a first direction;
   a liquid crystal layer interposed between the first substrate and the second substrate; and
   a multi-layered sealant disposed on the peripheral area of the first substrate and surrounding the liquid crystal layer,
   wherein the multi-layered sealant includes:
     a first sealant layer including an acrylate resin, and
     a second sealant layer including an epoxy resin having a (meth)arcylate group, and
   wherein each of the first sealant layer and the second sealant layer includes a plurality of particles formed of a silica,
   wherein the particles of the first sealant layer are formed of a first particle having a first diameter and a second particle having a second diameter which is greater that the first diameter.

2. The display panel of claim 1,
   wherein the multi-layered sealant is about 0.1 mm to about 1.0 mm in width measured in a second direction crossing the first direction, and the multi-layered sealant is about 2 μm to about 5 μm in height measured in the first direction.

3. The display panel of claim 1,
   wherein the multi-layered sealant further includes a third sealant layer, wherein the first sealant layer, the second sealant layer, and the third sealant layer are vertically stacked on each other along the first direction.

4. The display panel of claim 3, further comprising:
a first dam partly covering a first side surface of the multi-layered sealant; and
a second dam partly covering a second side surface of the multi-layered sealant, wherein the second dam is in contact with the liquid crystal layer.

5. The display panel of claim 4,
wherein the first dam and the second dam are about 0.02 mm to about 0.05 mm in width measured in a second direction crossing the first direction.

6. The display panel of claim 1,
wherein the first sealant layer and the second sealant layer are stacked side by side along a second direction crossing the first direction, and
wherein the second sealant layer is interposed between the first sealant layer and the liquid crystal layer.

7. The display panel of claim 6, further comprising:
a first dam interposed between the first sealant layer and the second sealant layer; and
a second dam interposed between the second sealant layer and the liquid crystal layer.

8. The display panel of claim 6, further comprising:
an air layer interposed between the first sealant layer and the second sealant layer.

9. The display panel of claim 8,
wherein the air layer is about 0.02 mm to about 0.05 mm in width measured along a second direction crossing the first direction.

10. The display panel of claim 6,
wherein the first sealant layer is disposed between the second sealant layer and the liquid crystal layer.

11. The display panel of claim 10, further comprising:
a first dam interposed between the first sealant layer and the second sealant layer; and
a second dam interposed between the first sealant layer and the liquid crystal layer.

12. The display panel of claim 11, further comprising:
an air layer disposed between the first sealant layer and the second sealant layer.

13. The display panel of claim 12,
wherein a width of the air layer is about 0.02 mm to about 0.05 mm in width.

14. A method for manufacturing a display panel, comprising:
providing a sealing composition to a peripheral area of a first substrate, the sealing composition including a first sealing composition including acrylate resin, and a second sealing composition including modified epoxy resin having a (meth)arcylate group;
forming a dam on the peripheral area of the first substrate to prevent a flow of the sealing composition;
stacking a second substrate on the sealing composition to face the first substrate;
providing light to the sealing composition to harden the sealing composition; and
providing heat to the sealing composition to further harden the sealing composition,
wherein the sealing composition is formed in a first height and the dam is formed in a second height less than the first height,
wherein the first sealing composition includes a plurality of particles formed of a silica, and
wherein the particles of the first sealing composition are formed of a first particle having a first diameter and a second particle having a second diameter which is greater that the first diameter.

15. The method of claim 14,
wherein the first sealing composition comprises:
about 10% by weight to about 40% by weight of a modified epoxy resin including an acrylate group;
about 2% by weight to about 10% by weight of an acrylate resin including a functional group having at least 3 carbon atoms;
about 10% by weight to about 40% by weight of an acrylate monomer;
about 1% by weight to about 30% by weight of a heat-curing agent;
about 1% by weight to about 30% by weight of a photo-polymerization initiator;
about 10% by weight to about 50% by weight of a filler: and
about 10% by weight to about 30% by weight of a solvent.

16. The method of claim 14,
wherein the second sealing composition comprises:
about 10% by weight to about 40% by weight of a modified epoxy resin including a (meth)acrylate group;
about 2% by weight to about 10% by weight of an acrylate resin including at least 3 functional groups having at least 5 carbon atoms;
about 30% by weight to about 40% by weight of an acrylate monomer; about 3% by weight to about 10% by weight of a heat-curing agent;
about 1% by weight to about 10% by weight of a photo-polymerization initiator;
about 10% by weight to about 50% by weight of a filler; and
about 10% by weight to about 30% by weight of a solvent.

17. The method of claim 14,
wherein the sealing composition further comprises:
a third sealing composition including: about 30% by weight to about 40% by weight of a modified epoxy resin including an acrylate group;
about 2% by weight to about 10% by weight of an acrylate resin including a functional group having at least 3 carbon atoms;
about 10% by weight to about 40% by weight of an acrylate monomer;
about 1% by weight to about 10% by weight of a heat-curing agent;
about 1% by weight to about 10% by weight of a photo-polymerization initiator;
about 10% by weight to about 50% by weight of a filler; and
about 10% by weight to about 30% by weight of a solvent.

18. The method of claim 17,
wherein the providing a sealing composition comprises:
providing the first sealing composition;
providing the second sealing composition on the first sealing composition; and
providing the third sealing composition on the second sealing composition.

19. The method of claim 14,
wherein the first sealing composition and the second sealing composition are provided to the first substrate at the same time.

20. The display panel of claim 1, further comprising:
a dam disposed on the peripheral area of the first substrate,
wherein the multi-layered sealant has a first height, and wherein the dam has a second height less than the first height.

* * * * *